United States Patent
Ogata

(10) Patent No.: US 11,659,101 B2
(45) Date of Patent: May 23, 2023

(54) IMAGE FORMING APPARATUS

(71) Applicant: FUJIFILM Business Innovation Corp., Tokyo (JP)

(72) Inventor: Kenta Ogata, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/553,631

(22) Filed: Dec. 16, 2021

(65) Prior Publication Data

US 2023/0054980 A1   Feb. 23, 2023

(30) Foreign Application Priority Data

Aug. 23, 2021   (JP) .............................. JP2021-135423

(51) Int. Cl.
*H04N 1/00* (2006.01)
*G01S 17/04* (2020.01)
*G01S 17/08* (2006.01)

(52) U.S. Cl.
CPC ......... *H04N 1/00037* (2013.01); *G01S 17/04* (2020.01); *G01S 17/08* (2013.01); *H04N 1/00519* (2013.01); *H04N 1/00896* (2013.01); *H04N 2201/0094* (2013.01)

(58) Field of Classification Search
CPC ....... H04N 1/00891; H04N 2201/0094; H04N 1/00896; H04N 1/00904; H04N 1/00336; H04N 1/00323; H04N 1/00474; H04N 1/00814; H04N 1/00901; H04N 1/00925; H04N 1/00007; H04N 1/00053; H04N 1/00082; H04N 1/00037; H04N 1/00251; H04N 1/00395; H04N 1/00411; G01B 11/026; G01S 17/46; G01S 7/4912; G01S 17/04; G01S 17/48; G01S 7/493; G01S 7/497; G01C 3/08; G01C 3/085; G03G 15/5004; G03G 15/5016; G03G 15/5091; G03G 15/2039; G03G 15/5087; G03G 15/55; G03G 15/80; G06F 1/3206; G06N 20/00; G06N 3/0445; G06N 3/084; G06V 20/52; G06V 40/166; G06V 40/20; G06V 40/23
USPC ....................................................... 358/1.15
See application file for complete search history.

(56) References Cited

U.S. PATENT DOCUMENTS

| | | | |
|---|---|---|---|
| 5,488,468 A * | 1/1996 | Kawanishi ........... | G01B 11/026 356/3.02 |
| 2014/0368855 A1* | 12/2014 | Yamano ................ | G06F 1/3284 358/1.13 |
| 2015/0253719 A1* | 9/2015 | Matsumoto ........ | G03G 15/5004 399/88 |
| 2018/0032022 A1* | 2/2018 | Hada ..................... | G03G 15/80 |
| 2018/0034988 A1* | 2/2018 | Yokoyama ......... | H04N 1/00551 |

(Continued)

FOREIGN PATENT DOCUMENTS

JP   2012203131   10/2012

*Primary Examiner* — Negussie Worku
(74) *Attorney, Agent, or Firm* — JCIPRNET

(57) ABSTRACT

An image forming apparatus includes: a human presence sensor that detects a user who uses the image forming apparatus; a first covering provided in front of the human presence sensor; and a second covering provided in front of the first covering, the second covering being configured not to interfere with detection of a detection target by the human presence sensor.

20 Claims, 9 Drawing Sheets

(56) References Cited

U.S. PATENT DOCUMENTS

2018/0210679 A1* 7/2018 Hikichi ................ G06F 3/1286
2020/0053234 A1* 2/2020 Takahashi .............. G06N 3/084

* cited by examiner

DISTANCE BETWEEN
TRANSPARENT COVERING 33
AND BLACK COVERING 34

… (1)

IMAGE FORMING APPARATUS

CROSS-REFERENCE TO RELATED APPLICATIONS

This application is based on and claims priority under 35 USC 119 from Japanese Patent Application No. 2021-135423 filed Aug. 23, 2021.

BACKGROUND

(i) Technical Field

The present disclosure relates to an image forming apparatus.

(ii) Related Art

Japanese Unexamined Patent Application Publication No. 2012-203131 discloses an image processing apparatus that, upon detection of a moving body (user) by a human presence sensor, determines whether to cause the apparatus to enter a standby mode by using a commercial power supply as a power supply source and supplying power to various devices in accordance with the state of the moving body, or to enter a sleep mode again, thereby reducing unnecessary power consumption.

There are image forming apparatuses provided with a human presence sensor that detects a user who uses the image forming apparatus, and the operation of the apparatus is controlled using the detection result of the human presence sensor. Hitherto, in order to make this human presence sensor invisible to the user, a black covering, for example, is provided in front of the human presence sensor.

In recent years, a transparent covering, for example, is sometimes provided for design reasons in front of the image forming apparatus. However, if such a transparent covering is overlappingly provided in front of the human presence sensor, the human presence sensor may not be able to accurately detect the user who uses the image forming apparatus.

SUMMARY

Aspects of non-limiting embodiments of the present disclosure relate to providing an image forming apparatus capable of detecting a user who uses the image forming apparatus even in the case where two coverings are provided in front of a human presence sensor that detects the user who uses the image forming apparatus.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including: a human presence sensor that detects a user who uses the image forming apparatus; a first covering provided in front of the human presence sensor; and a second covering provided in front of the first covering, the second covering being configured not to interfere with detection of a detection target by the human presence sensor.

BRIEF DESCRIPTION OF THE DRAWINGS

An exemplary embodiment of the disclosure will be described in detail based on the following figures, wherein.

DETAILED DESCRIPTION

Next, an exemplary embodiment of the disclosure will be described in detail with reference to the drawings.

Figure 1:
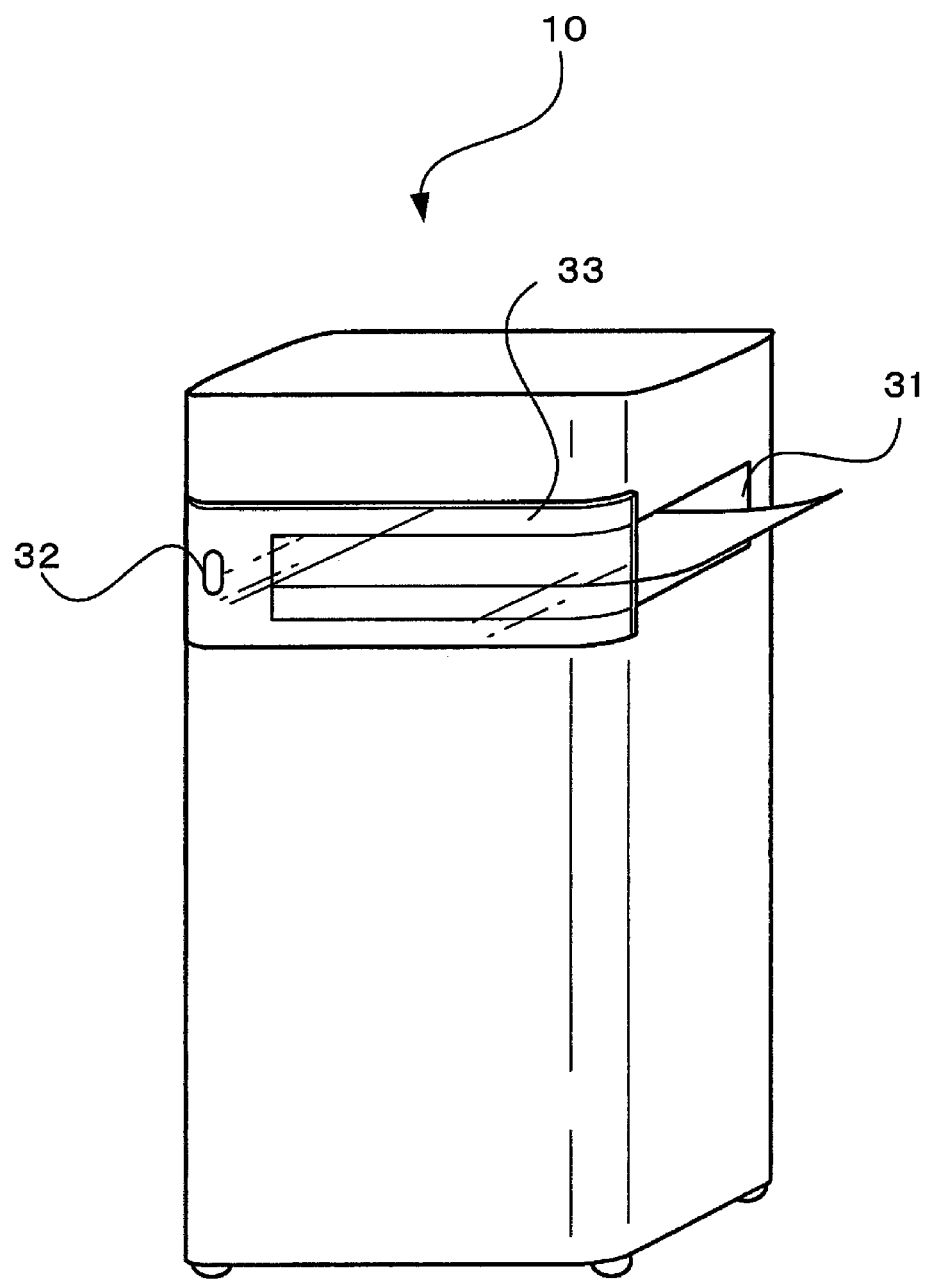
FIG. 1 is an external view for describing a schematic configuration of an image forming apparatus according to an exemplary embodiment of the disclosure.

FIG. 1 is an external view for describing a schematic configuration of an image forming apparatus 10 according to the exemplary embodiment. In FIG. 1, only configurations related to the description of the exemplary embodiment of the disclosure are illustrated, and other configurations are omitted.

The image forming apparatus 10 is a so-called multifunctional peripheral having multiple functions including a print function, a scan function, a copy function, and a facsimile function. In the image forming apparatus 10, a paper output tray 31 into which printed paper is ejected is provided in the body in an upper portion of the image forming apparatus 10. In addition, a human presence sensor 32, which detects a user who uses the image forming apparatus 10, is provided on the left side of the front surface of the image forming apparatus 10.

A transparent covering 33 is provided in front of the location where the paper output tray 31 is provided. The transparent covering 33 is provided for design reasons to make the front shape of the image forming apparatus 10 appear flat. Note that the transparent covering 33 is made of a transparent material, and paper ejected into the paper output tray 31 is visible through the transparent covering 33.

Here, for design reasons, the transparent covering 33 has the same length as the width of the image forming apparatus 10, and is structured to cover the human presence sensor 32 provided on the left side of the paper output tray 31. In the exemplary embodiment, however, the transparent covering 33 may have a length different from the width of the image forming apparatus 10, or the transparent covering 33 may be positioned in front of the human presence sensor 32.

Figure 2:
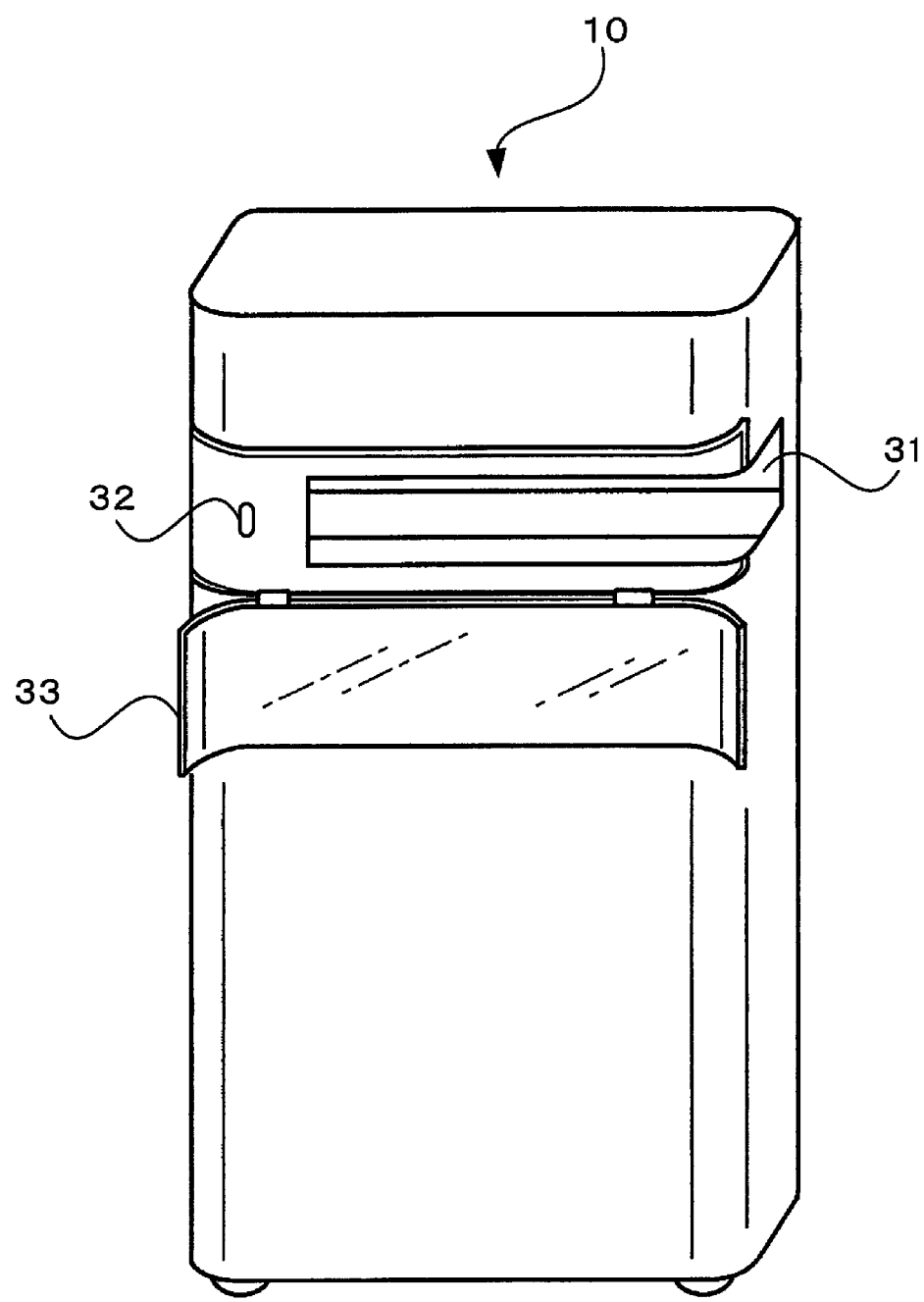
FIG. 2 is an external view in the case where a transparent covering is opened not to cover a human presence sensor of the image forming apparatus according to the exemplary embodiment.

Furthermore, the transparent covering 33 is configured to be openable/closable in front of the image forming apparatus 10, as illustrated in FIG. 2, and is configured to be capable of changing between the state of covering the human presence sensor 32 and the state of not covering the human presence sensor 32. By having the transparent covering 33 opened, paper ejected into the paper output tray 31 becomes clearly visible. A user who prefers such a state may use the image forming apparatus 10 while having the transparent covering 33 opened.

Note that the human presence sensor 32 is provided inside the image forming apparatus 10, and, in order to make the description simple in FIGS. 1 and 2, a covering that covers a human presence sensor is indicated by a leader line as the human presence sensor 32.

Figure 3:
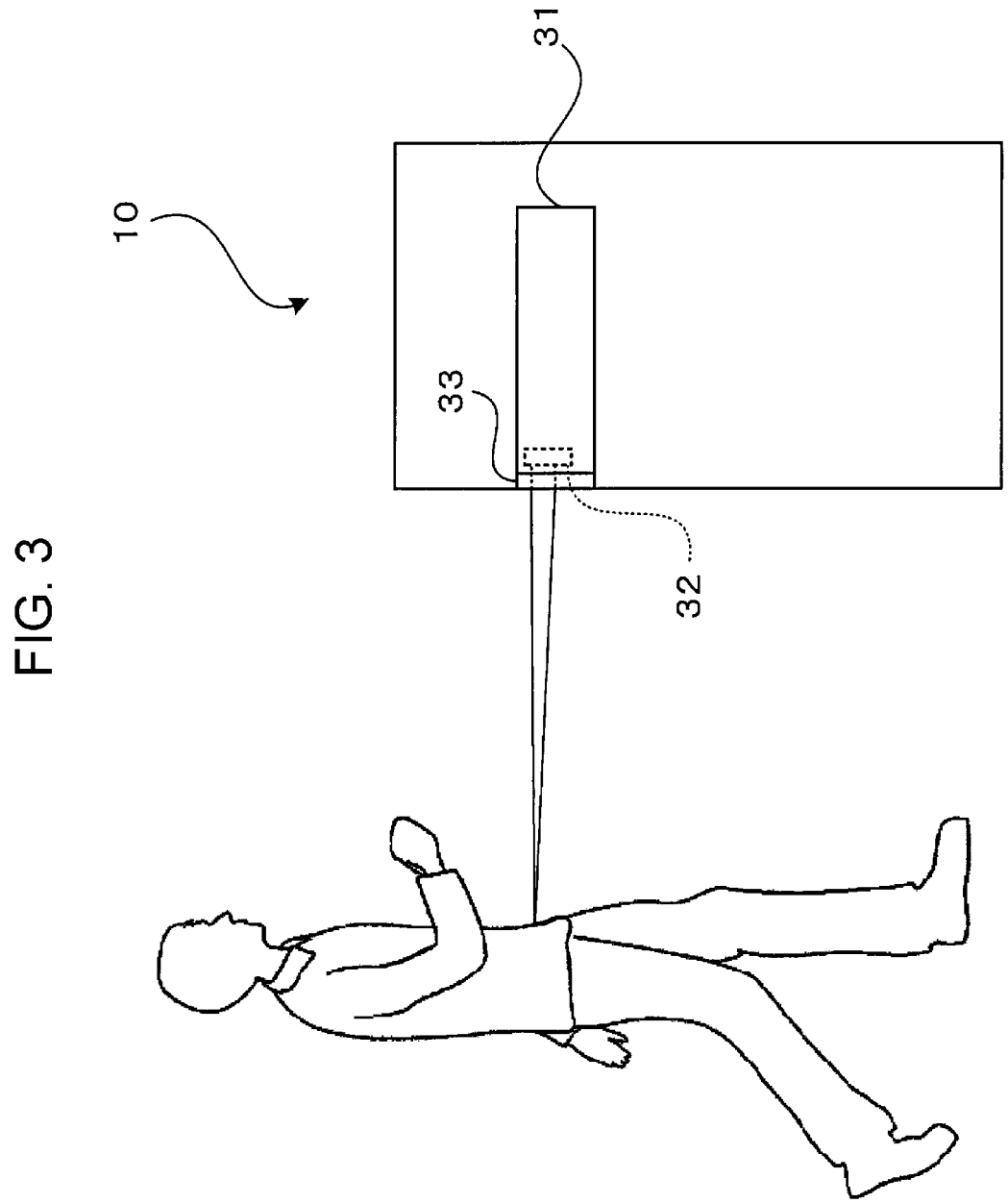
FIG. 3 is a diagram illustrating the situation in which the human presence sensor detects a user who is approaching the image forming apparatus to use the image forming apparatus.

As the human presence sensor 32, for example, a ranging sensor that includes a light source emitting measurement light, and a position detecting element detecting a position at which reflected light of the measurement light is received, and that is capable of detecting a distance to a user by measuring a distance to a detection target on the basis of the output value of the position detecting element may be used. FIG. 3 illustrates the situation in which the human presence sensor 32 detects a user who is approaching the image forming apparatus 10 to use the image forming apparatus 10. As illustrated in FIG. 3, light emitted from the human presence sensor 32 is reflected by the user, and this reflected light enters the human presence sensor 32, thereby allowing measurement of the distance between the image forming apparatus 10 and the user.

Although the case in which a ranging sensor is used as the human presence sensor 32 is discussed in the exemplary embodiment, any sensor may be used as long as it is capable of detecting the user who uses the image forming apparatus 10.

In the image forming apparatus 10 of the exemplary embodiment, for example, by detecting the user who uses the image forming apparatus 10 using the human presence sensor 32, control is applied to cause the image forming apparatus 10 to return from a power saving state to a normal operating state. Here, the normal operating state means a state in which power is supplied to each unit of the image forming apparatus 10, thereby making various functions of the image forming apparatus 10 usable. The power saving state is a state in which power supply to each unit of the image forming apparatus 10 is partially stopped, thereby making the power consumption smaller than that in the normal operating state.

Figure 4:
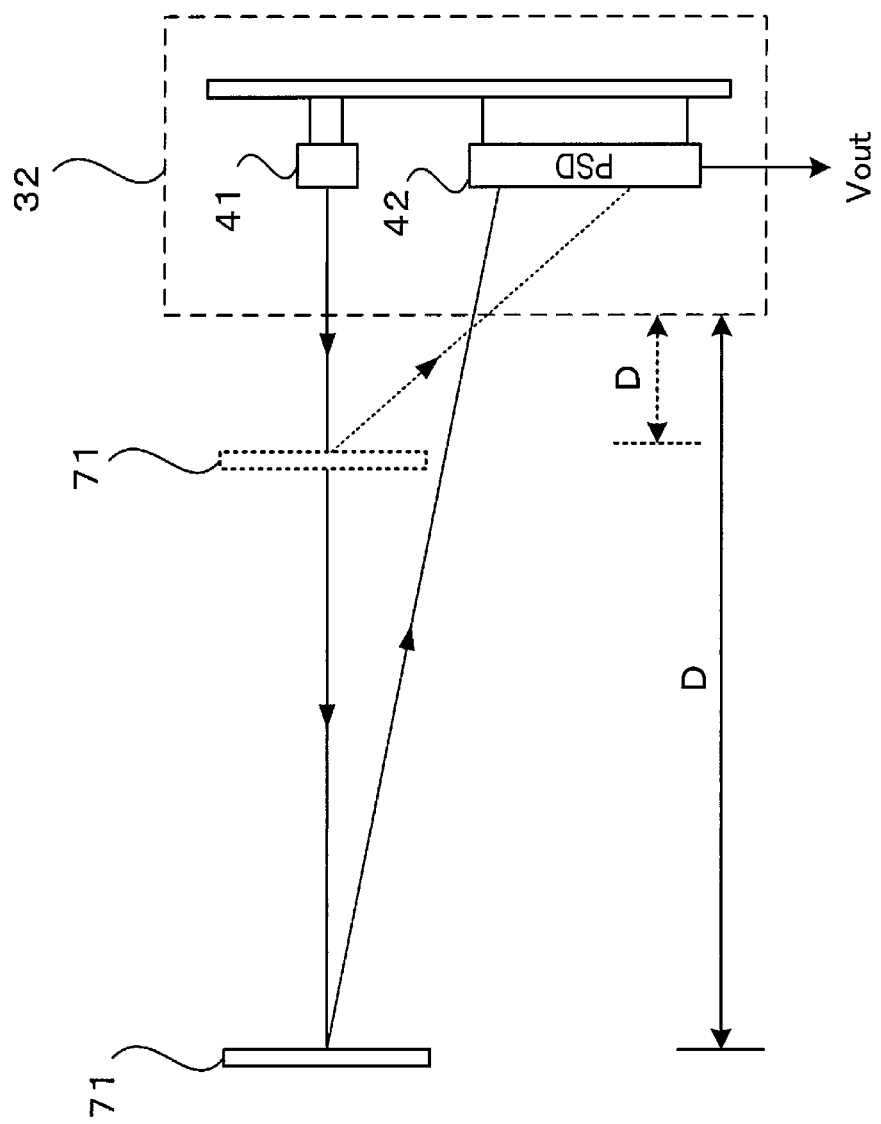
FIG. 4 is a diagram for describing the structure of the human presence sensor.

Next, the structure of the human presence sensor 32 will be described with reference to FIG. 4.

The human presence sensor 32 includes a light-emitting diode (LED) 41, and a position sensitive detector (PSD) 42. Note that FIG. 4 is a diagram for describing the operation principle and structure of the human presence sensor 32, and the structure of the optical system including a lens and so forth is omitted.

The LED 41 emits light to a detection target 71 to be measured, such as a user. Light emitted by the LED 41 is reflected by the detection target 71, and enters the PSD 42. A spot position that is a position at which the reflected light from the detection target 71 enters the PSD 42 changes according to a distance D between the detection target 71 and the human presence sensor 32.

In short, the spot position changes between the case where the distance D becomes longer as the position of the detection target 71 becomes farther from the human presence sensor 32, and the case where the distance D becomes shorter as the position of the detection target 71 becomes closer to the human presence sensor 32.

The PSD 42 is configured to have its output voltage Vout changeable according to the spot position at which the reflected light enters. Therefore, the mechanism is such that the spot position is specified by detecting the output voltage Vout, and the distance D to the detection target 71 is calculated by triangulation using the spot position and the distance between the PSD 42 and the LED 41.

Here, in the image forming apparatus 10 of the exemplary embodiment, a black covering is provided in front of the human presence sensor 32. In short, in a state where the transparent covering 33 is closed, the structure is such that two coverings are provided in front of the human presence sensor 32. The black covering may be structured to make the human presence sensor 32 invisible from the outside. Here, being invisible from the outside is not limited to the case of being completely invisible, and includes the case of being slightly visible and difficult to see.

Figure 5:
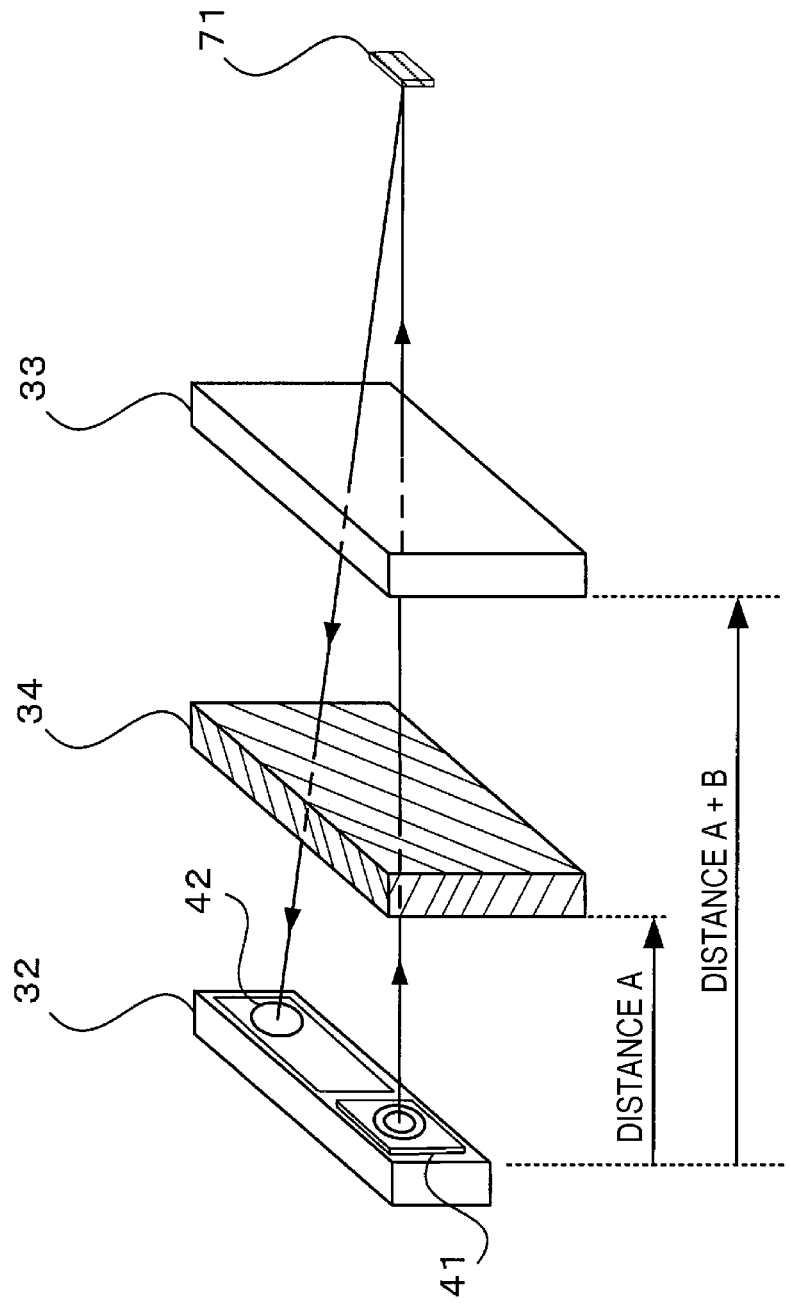
FIG. 5 is a diagram for describing the situation in which a black covering is arranged in front of the human presence sensor, and the transparent covering is arranged in front of the black covering.

Specifically, as illustrated in FIG. 5, the image forming apparatus 10 of the exemplary embodiment includes the human presence sensor 32, which detects the user who uses the image forming apparatus 10; a black covering 34, which is provided in front of the human presence sensor 32; and the transparent covering 33, which is arranged in front of the black covering 34 and configured not to interfere with detection of the detection target 71 by the human presence sensor 32. Therefore, it means that there are two coverings, the black covering 34 and the transparent covering 33, in front of the human presence sensor 32. As a result, light emitted from the LED 41 of the human presence sensor 32 passes through the black covering 34 and then the transparent covering 33, is reflected by the detection target 71, again passes through the transparent covering 33 and the black covering 34, and enters the PSD 42.

Here, the transparent covering 33 is a covering structured to make the black covering 34 visible from the outside. However, the transparent covering 33 does not allow the entire light to pass through, and light is partially reflected by the transparent covering 33. Therefore, when light emitted from the LED 41 of the human presence sensor 32 passes through the black covering 34, is reflected by the transparent covering 33, and enters the PSD 42, the distance to the user may not be accurately detected, which may result in incapability of detecting the user who uses the image forming apparatus 10.

For such reasons, even in the case where the transparent covering 33 is closed, and there are two coverings, the black covering 34 and the transparent covering 33, in front of the human presence sensor 32, it is necessary to make it possible to accurately detect the distance to the user.

Therefore, in the image forming apparatus 10 of the exemplary embodiment, even in the case where the black covering 34 is provided in front of the human presence sensor 32 for detecting the user who uses the image forming apparatus 10, and the transparent covering 33 is arranged in front of the black covering 34, the transparent covering 33 is configured not to interfere with detection of the detection target 71 by the human presence sensor 32 so that the human presence sensor 32 will be able to detect the user serving as the detection target 71.

Specifically, the transparent covering 33 is made of a material capable of transmitting the wavelength of measurement light used by the human presence sensor 32. For example, in the case where light emitted from the LED 41 is near-infrared light, the transparent covering 33 is made of a material with a transmittance of 70% or greater in a band where the wavelength of light is greater than or equal to 800 nm and less than or equal to 940 nm.

In addition, the distance between the black covering 34 and the transparent covering 33 will also affect detection of the target body 71 by the human presence sensor 32.

Therefore, in the image forming apparatus 10 of the exemplary embodiment, while the transparent covering 33 is covering the human presence sensor 32, the distance between the black covering 34 and the transparent covering 33 is configured not to interfere with detection of the detection target 71 by the human presence sensor 32.

Specifically, while the transparent covering 33 is covering the human presence sensor 32, the distance between the black covering 34 and the transparent covering 33 is configured to be less than or equal to 5 cm.

The reason that the distance between the black covering 34 and the transparent covering 33 is configured to be less than or equal to 5 cm in order to enable detection of the user even in the case where two coverings, the black covering 34 and the transparent covering 33, are provided in front of the human presence sensor 32 will be described below.

Figure 6:
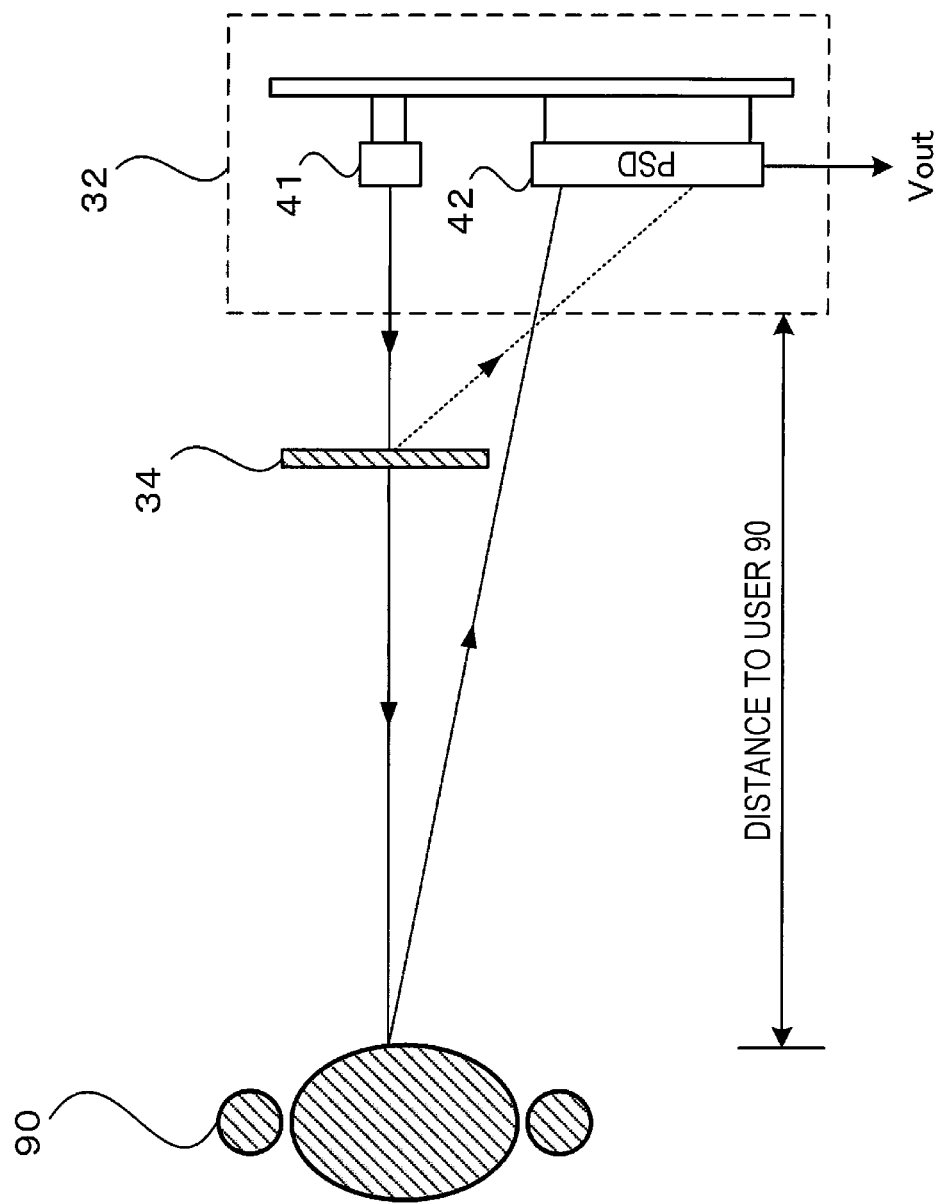
FIG. 6 is a diagram illustrating the situation in the case where light from the human presence sensor passes only through the black covering, is reflected by the user, and returns.

At first, FIG. 6 illustrates the situation in the case where there is no transparent covering 33, that is, light from the human presence sensor 32 passes only through the black covering 34, is reflected by a user 90, and returns.

Figure 7:
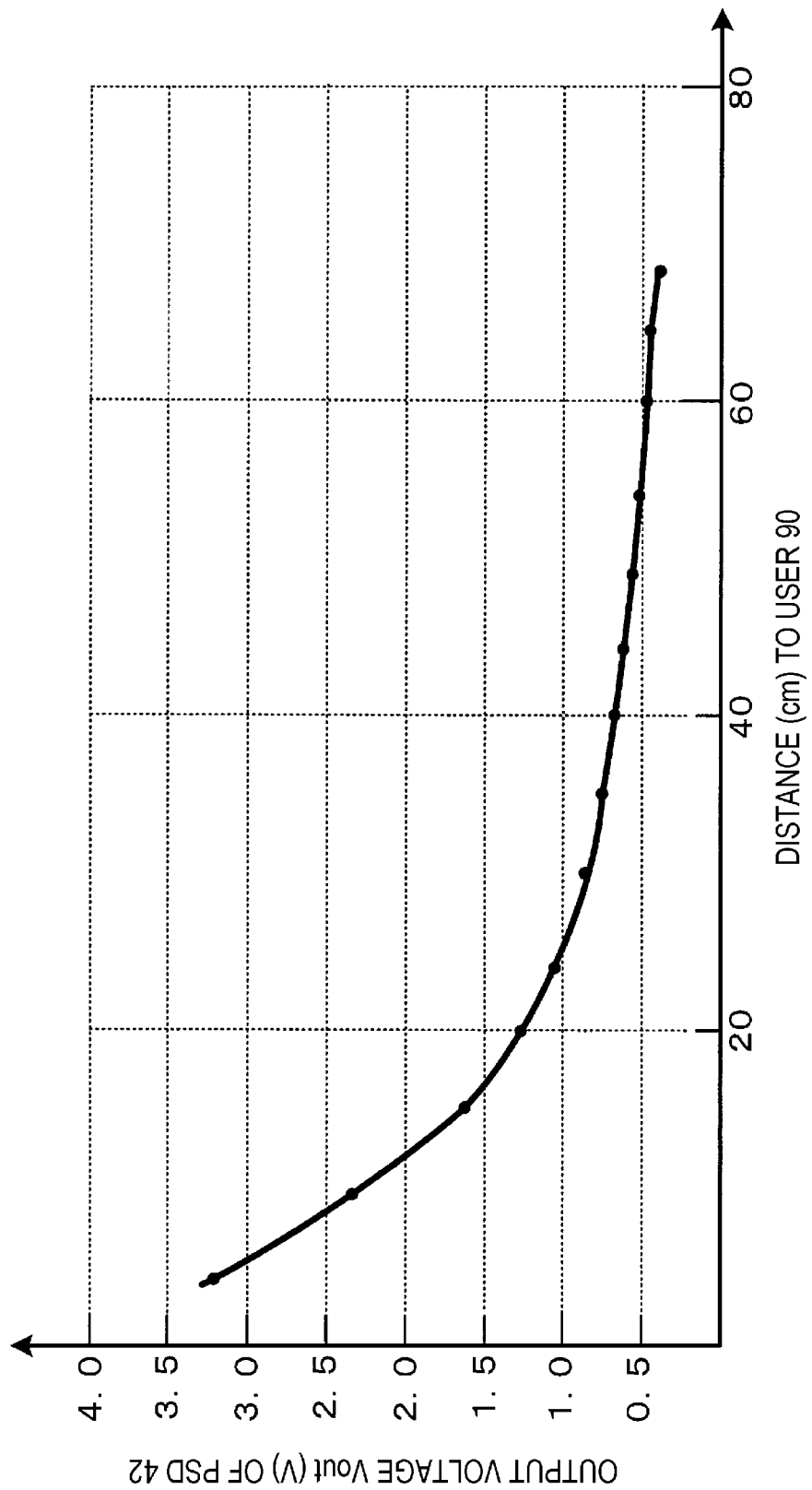
FIG. 7 is a diagram illustrating an example of the relationship between an output voltage of a position sensitive detector (PSD) and a distance to the user in the state illustrated in FIG. 6.

FIG. 7 illustrates an example of the relationship between the output voltage Vout of the PSD 42 and the distance to the user 90 in the state illustrated in FIG. 6. Referring to FIG. 7, it is clear that, as the distance to the user 90 becomes shorter, the voltage value of the output voltage Vout of the PSD 42 becomes greater.

For example, it is clear that, when the distance D to the user 90 is 60 cm, the output voltage Vout of the PSD 42 is about 0.5 V; and, when the distance D to the user 90 is 20 cm, the output voltage Vout of the PSD 42 is about 1.25 V.

By detecting the output voltage Vout of the PSD 24 described above, the distance to the user 90 may be measured.

Here, as illustrated in FIG. 5, in the case where the distance from the human presence sensor 32 to the black covering 34 is distance A and the distance between the black covering 34 and the transparent covering 33 is distance B, the distance from the human presence sensor 32 to the transparent covering 33 is distance A+distance B. By making the distance B as close to 0 as possible, i.e., by arranging the black covering 34 and the transparent covering 33 as close to each other as possible, it should be possible to reduce erroneous detection caused by reflected light due to the transparent covering 33. However, the distance B may not be made 0 for design reasons.

Figure 8:
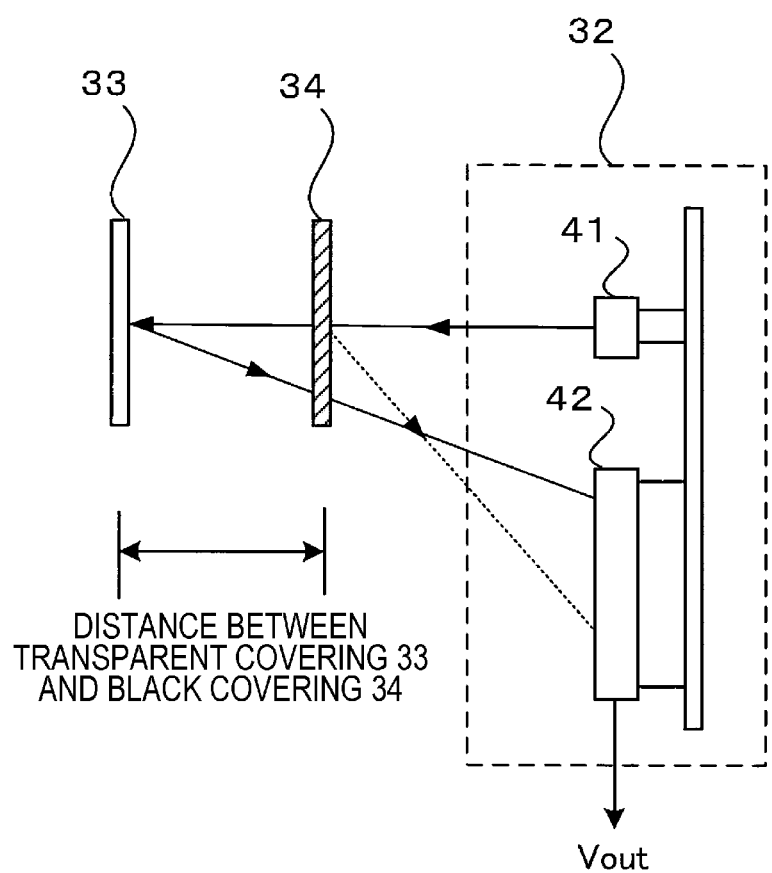
FIG. 8 is a diagram illustrating the situation in the case where light from the human presence sensor passes through both the black covering and the transparent covering.

Next, FIG. 8 illustrates the situation in the case where the transparent covering 33 is provided in front of the human presence sensor 32, that is, the case where light from the human presence sensor 32 passes through both the black covering 34 and the transparent covering 33.

Figure 9:
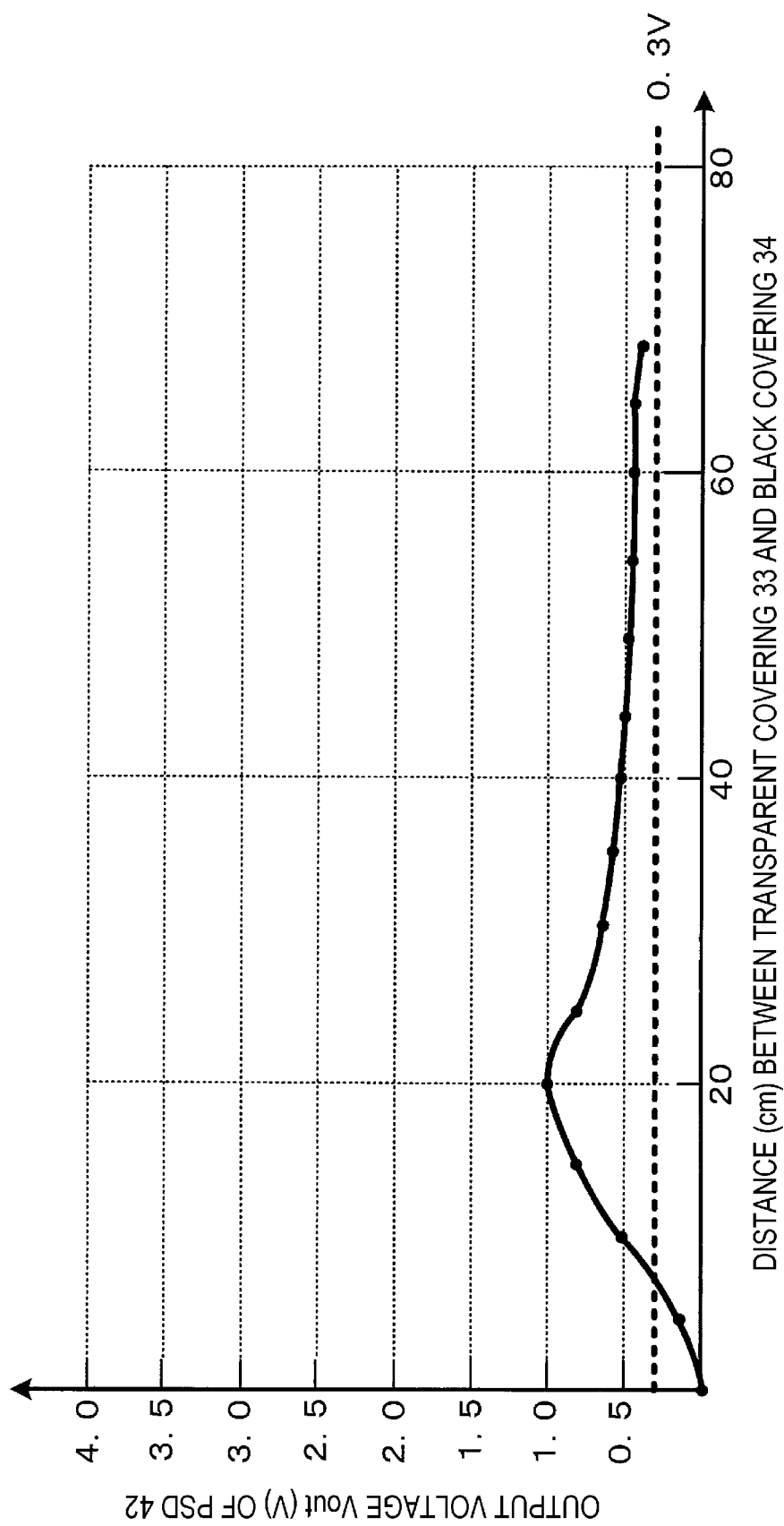
FIG. 9 is a diagram illustrating an example of the relationship between the output voltage of the PSD and a distance between the transparent covering and the black covering.

FIG. 9 illustrates an example of the relationship between the output voltage Vout of the PSD 42 and the distance between the transparent covering 33 and the black covering 34 in the state illustrated in FIG. 8. Referring to FIG. 9, it is clear that, when the distance between the transparent covering 33 and the black covering 34 is 0, that is, when the transparent covering 33 and the black covering 34 are regarded as a single covering, the voltage value of the output voltage Vout of the PSD 42 is substantially 0 V. However, it is clear that, when the distance between the transparent covering 33 and the black covering 34 becomes gradually longer by gradually moving the black covering 34 away from the transparent covering 33, the voltage value of the output voltage Vout of the PSD 42 increases. For example, when the distance between the transparent covering 33 and the black covering 34 becomes 20 cm, the output voltage Vout of the PSD 42 becomes about 1.0 V. When the distance between the transparent covering 33 and the black covering 34 becomes yet longer, the output voltage Vout of the PSD 42 gradually decreases.

Even in the case where there is no user 90 serving as a detection target as described above, the output voltage Vout may sometimes increase due to the presence of the transparent covering 33. Therefore, by reducing the voltage value of the output voltage Vout according to the reflected light due to the transparent covering 33, the impact on the output voltage Vout based on the distance to the detection target 71 may be reduced. For example, when the voltage value of the output voltage Vout according to the reflected light due to the transparent covering 33 is less than or equal to 0.3 V, there is no great impact on detection of the distance to the detection target 71. Therefore, by adjusting the distance between the black covering 34 and the transparent covering 33 while the transparent covering 33 is covering the human presence sensor 32, the impact of the reflected light due to the transparent covering 33 on the output voltage Vout of the PSD 42 may be reduced to the extent that there is no practical problem. For example, by adjusting the distance between the black covering 34 and the transparent covering 33 to be less than or equal to 5 cm, a distance is realized that may reduce the impact of the reflected light due to the transparent covering 33 on the output voltage Vout of the PSD 42 to the extent that there is no practical problem.

Although the case in which the black covering 34 is provided in front of the human presence sensor 32 has been discussed by way of example in the exemplary embodiment, the exemplary embodiment of the disclosure is not limited to such a case, and the exemplary embodiment of the disclosure is similarly applicable to the case where a covering of another color, not limited to black, is provided in front of the human presence sensor 32.

Furthermore, although the case in which a covering provided in front of the black covering 34 is the transparent covering 33 has been discussed by way of example in the exemplary embodiment, the exemplary embodiment of the disclosure is not limited to such a case, and the covering may be of another color, not limited to transparent, as long as the covering is made of a material capable of transmitting light emitted from the human presence sensor 32.

In addition, although one human presence sensor 32 is used to detect the user who uses the image forming apparatus 10 in the above-described exemplary embodiment, the exemplary embodiment of the disclosure is not limited to such a case, and the exemplary embodiment of the disclosure may include the case where two human presence sensors are used to detect the user.

For example, the presence of the user may be detected using two human presence sensors, namely, a ranging sensor such as the above-mentioned human presence sensor 32, and a pyroelectric sensor capable of detecting the presence of a surrounding user in a wide detection range. Because the ranging sensor consumes large amount of power since it emits detection light by itself, the ranging sensor may be kept in standby in the power saving state, and only the pyroelectric sensor may be used to detect a user who is approaching the image forming apparatus. In response to detection of the user by the pyroelectric sensor, the ranging sensor may be activated to detect the distance to the user.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming apparatus comprising:
   a human presence sensor that detects a user who uses the image forming apparatus;
   a first covering provided in front of the human presence sensor; and
   a second covering provided in front of the first covering, the second covering being configured not to interfere with detection of a detection target by the human presence sensor, wherein the first covering and the second covering are aligned along a light emitting path of measurement light emitted from the human presence sensor.

2. The image forming apparatus according to claim 1, wherein the first covering is black.

3. The image forming apparatus according to claim 2, wherein the second covering is transparent.

4. The image forming apparatus according to claim 2, wherein the second covering is configured to be openable/closable in front of the image forming apparatus, and is configured to be capable of changing between a state of covering the human presence sensor and a state of not covering the human presence sensor.

5. The image forming apparatus according to claim 3, wherein the second covering is configured to be openable/closable in front of the image forming apparatus, and is configured to be capable of changing between a state of covering the human presence sensor and a state of not covering the human presence sensor.

6. The image forming apparatus according to claim 1, wherein the first covering is a covering structured to make the human presence sensor invisible from outside.

7. The image forming apparatus according to claim 6, wherein the second covering is configured to be openable/closable in front of the image forming apparatus, and is configured to be capable of changing between a state of covering the human presence sensor and a state of not covering the human presence sensor.

8. The image forming apparatus according to claim 1, wherein the second covering is a covering structured to make the first covering visible from outside.

9. The image forming apparatus according to claim 8, wherein the second covering is configured to be openable/closable in front of the image forming apparatus, and is configured to be capable of changing between a state of covering the human presence sensor and a state of not covering the human presence sensor.

10. The image forming apparatus according to claim 1, wherein the human presence sensor is a ranging sensor that includes a light source that emits the measurement light, and a position detecting element that detects a position at which reflected light of the measurement light is received, and the ranging sensor measures a distance to the detection target based on an output value of the position detecting element.

11. The image forming apparatus according to claim 10, wherein the second covering is made of a material capable of transmitting a wavelength of measurement light used by the human presence sensor.

12. The image forming apparatus according to claim 11, wherein the second covering is configured to be openable/closable in front of the image forming apparatus, and is configured to be capable of changing between a state of covering the human presence sensor and a state of not covering the human presence sensor.

13. The image forming apparatus according to claim 10, wherein the second covering is configured to be openable/closable in front of the image forming apparatus, and is configured to be capable of changing between a state of covering the human presence sensor and a state of not covering the human presence sensor.

14. The image forming apparatus according to claim 10, wherein the second covering is made of a material with a transmittance of 70% or greater in a band where a wavelength of light is greater than or equal to 800 nm and less than or equal to 940 mm.

15. The image forming apparatus according to claim 14, wherein the second covering is configured to be openable/closable in front of the image forming apparatus, and is configured to be capable of changing between a state of covering the human presence sensor and a state of not covering the human presence sensor.

16. The image forming apparatus according to claim 10, wherein, while the second covering is covering the human presence sensor, a distance between the first covering and the second covering is configured not to interfere with detection of the detection target by the human presence sensor.

17. The image forming apparatus according to claim 16, wherein, while the second covering is covering the human presence sensor, the distance between the first covering and the second covering is configured to be less than or equal to 5 cm.

18. The image forming apparatus according to claim 17, wherein the second covering is configured to be openable/closable in front of the image forming apparatus, and is configured to be capable of changing between a state of covering the human presence sensor and a state of not covering the human presence sensor.

19. The image forming apparatus according to claim 16, wherein the second covering is configured to be openable/closable in front of the image forming apparatus, and is configured to be capable of changing between a state of covering the human presence sensor and a state of not covering the human presence sensor.

20. The image forming apparatus according to claim 1, wherein the second covering is configured to be openable/closable in front of the image forming apparatus, and is configured to be capable of changing between a state of covering the human presence sensor and a state of not covering the human presence sensor.

* * * * *